(12) United States Patent
Stone

(10) Patent No.: US 8,549,970 B2
(45) Date of Patent: Oct. 8, 2013

(54) POWER SAW

(76) Inventor: Donald Jesse Stone, Rimrock, AZ (US)

( * ) Notice: Subject to any disclaimer, the term of this patent is extended or adjusted under 35 U.S.C. 154(b) by 287 days.

(21) Appl. No.: 11/805,832

(22) Filed: May 24, 2007

(65) Prior Publication Data
US 2007/0295182 A1    Dec. 27, 2007

Related U.S. Application Data

(60) Provisional application No. 60/809,053, filed on May 25, 2006.

(51) Int. Cl.
    *B27B 5/00*     (2006.01)
    *B26D 7/02*     (2006.01)

(52) U.S. Cl.
    USPC .............. 83/471.3; 83/452; 83/490

(58) Field of Classification Search
    USPC ............ 83/391, 452, 467.1, 468.1–468.3,
    83/468.7, 471, 471.3, 472, 473, 477.2,
    83/490; 269/58, 59, 74, 81
See application file for complete search history.

(56) References Cited

U.S. PATENT DOCUMENTS

| | | | | |
|---|---|---|---|---|
| 2,785,709 A * | 3/1957 | Shepp | ............ | 83/435.14 |
| 3,057,240 A * | 10/1962 | De Witt | ............ | 83/412 |
| 4,245,533 A * | 1/1981 | Batson | ............ | 83/471.3 |
| 4,283,977 A * | 8/1981 | Batson | ............ | 83/453 |
| 4,637,288 A * | 1/1987 | Olsen et al. | ............ | 83/375 |
| 4,974,306 A * | 12/1990 | Cole et al. | ............ | 29/434 |
| 5,161,443 A * | 11/1992 | Huang | ............ | 83/169 |
| 5,191,821 A * | 3/1993 | Metzger et al. | ............ | 83/425 |
| 5,220,857 A * | 6/1993 | Freeburger | ............ | 83/468.3 |
| 5,483,858 A * | 1/1996 | Chen | ............ | 83/464 |
| 5,595,124 A * | 1/1997 | Wixey et al. | ............ | 108/50.11 |
| 5,720,096 A * | 2/1998 | Dorsey | ............ | 29/559 |
| 5,755,148 A * | 5/1998 | Stumpf et al. | ............ | 83/468.2 |
| 5,845,555 A * | 12/1998 | Dawley | ............ | 83/467.1 |
| 5,865,079 A * | 2/1999 | Itzov | ............ | 83/471.3 |
| 5,941,152 A * | 8/1999 | Kim | ............ | 83/464 |
| 6,334,380 B1 * | 1/2002 | Huang | ............ | 83/471.2 |
| 6,478,664 B2 * | 11/2002 | Brazell | ............ | 451/280 |
| 6,543,323 B2 * | 4/2003 | Hayashizaki et al. | ............ | 83/466 |
| 6,557,601 B1 * | 5/2003 | Taylor | ............ | 144/253.1 |
| 6,880,442 B2 * | 4/2005 | Duginske | ............ | 83/468.7 |
| 7,464,737 B2 * | 12/2008 | Duginske | ............ | 144/253.1 |
| 2002/0127960 A1 | 9/2002 | Brazell | | |
| 2002/0194971 A1 * | 12/2002 | Park et al. | ............ | 83/477.2 |
| 2003/0033921 A1 * | 2/2003 | Chang | ............ | 83/471.3 |
| 2003/0209107 A1 | 11/2003 | Dibbern, Jr. et al. | | |
| 2005/0115376 A1 * | 6/2005 | Jimenez | ............ | 83/464 |
| 2006/0053992 A1 * | 3/2006 | Williams et al. | ............ | 83/435.12 |
| 2008/0282862 A1 * | 11/2008 | Wise | ............ | 83/468.2 |

\* cited by examiner

*Primary Examiner* — Stephen Choi
(74) *Attorney, Agent, or Firm* — Wayne D. House

(57) ABSTRACT

A power saw assembly including a base plate and having a powered blade assembly including a saw blade attached to the upper surface of the base plate. The powered blade assembly has at least one operating position for cutting material wherein the saw blade extends at least partially through a slot in said base plate. The power saw assembly further includes a fence assembly swivelable about a substantially vertical axis from a first position allowing the saw blade to cut through a piece of material at an angle of 90 degrees with respect to the length of the material, to other positions allowing the saw blade to cut through the material at angles other than 90 degrees with respect to the length of the material. The fence assembly is securable to the base plate at any position by clamping the fence assembly against the upper and lower surfaces of the base plate.

10 Claims, 12 Drawing Sheets

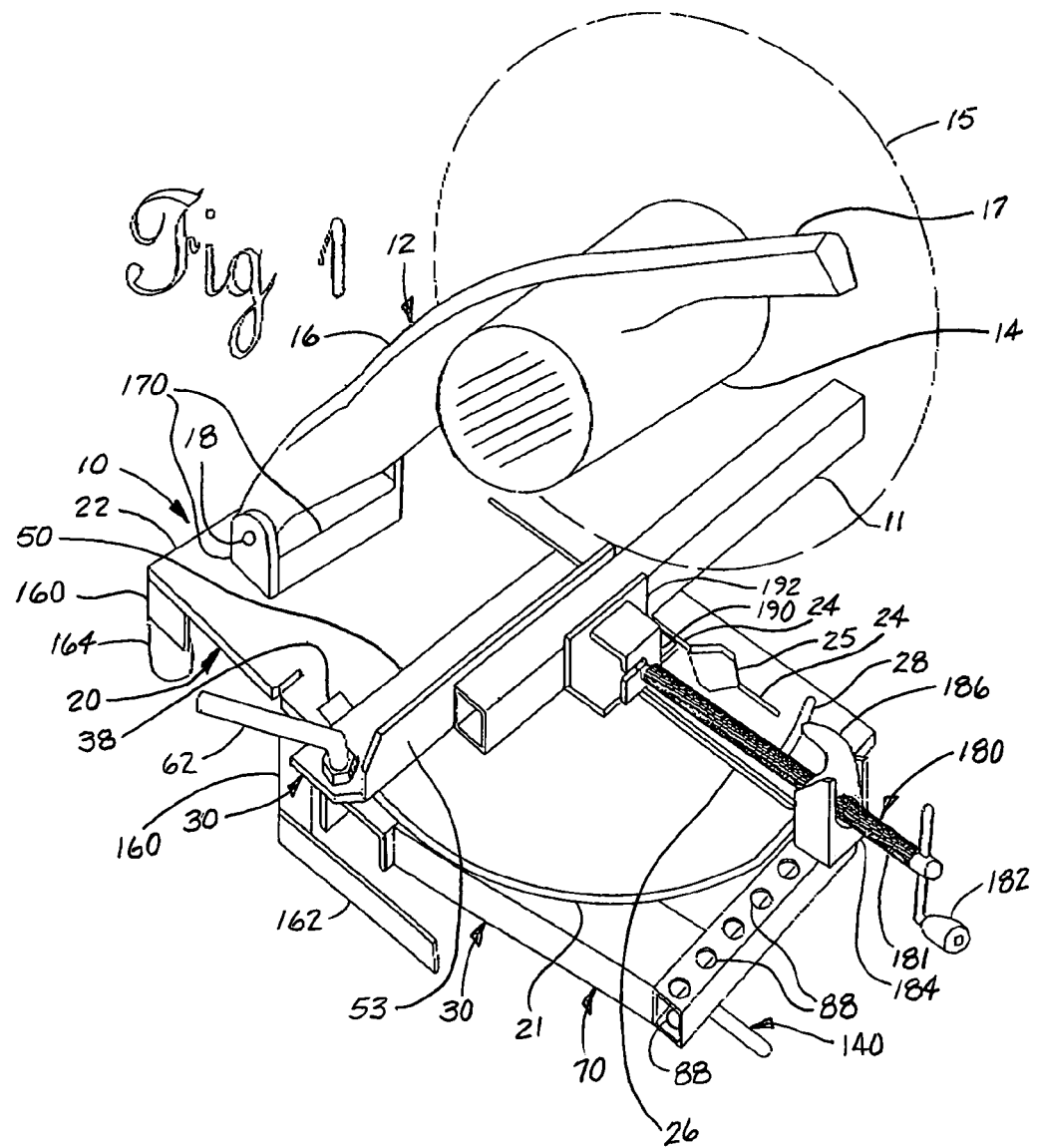

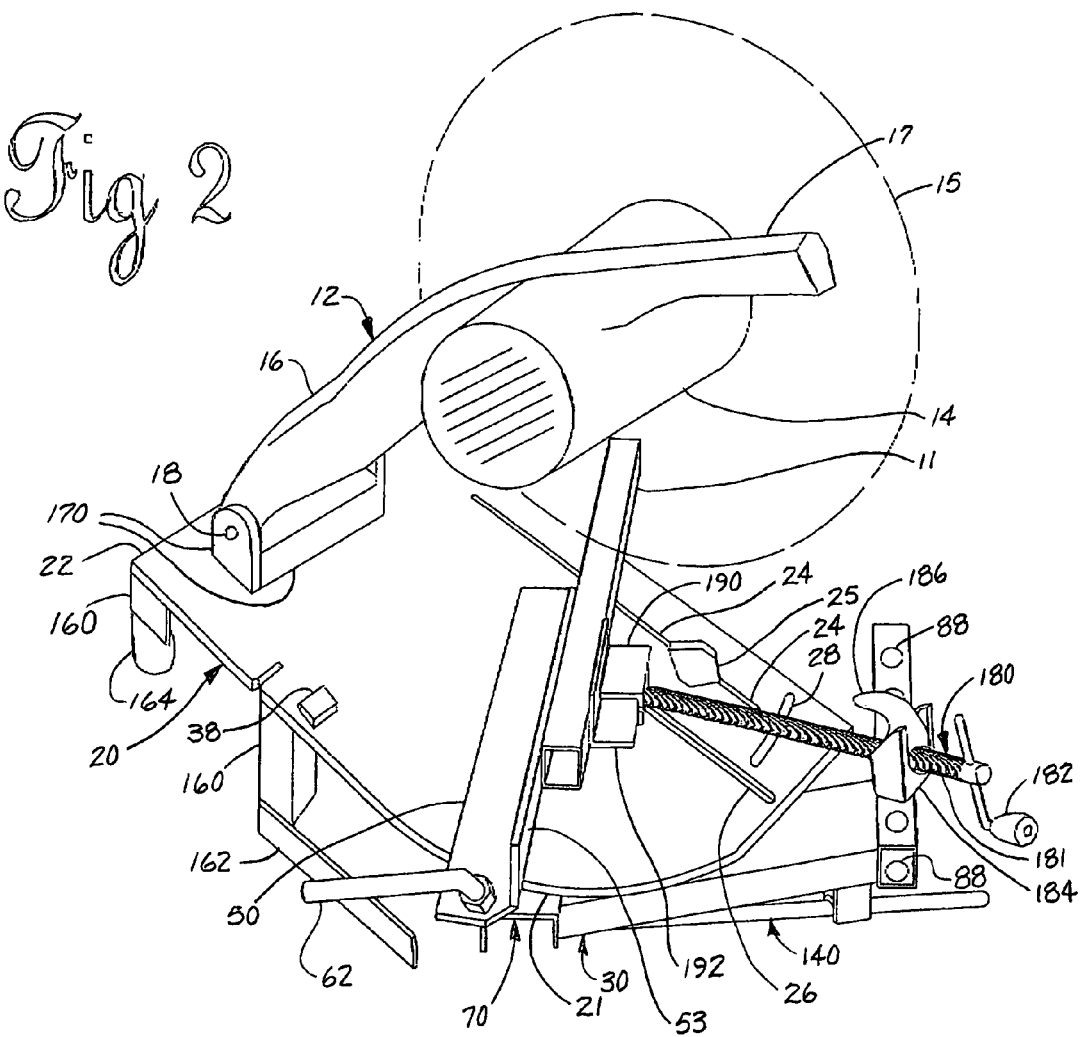

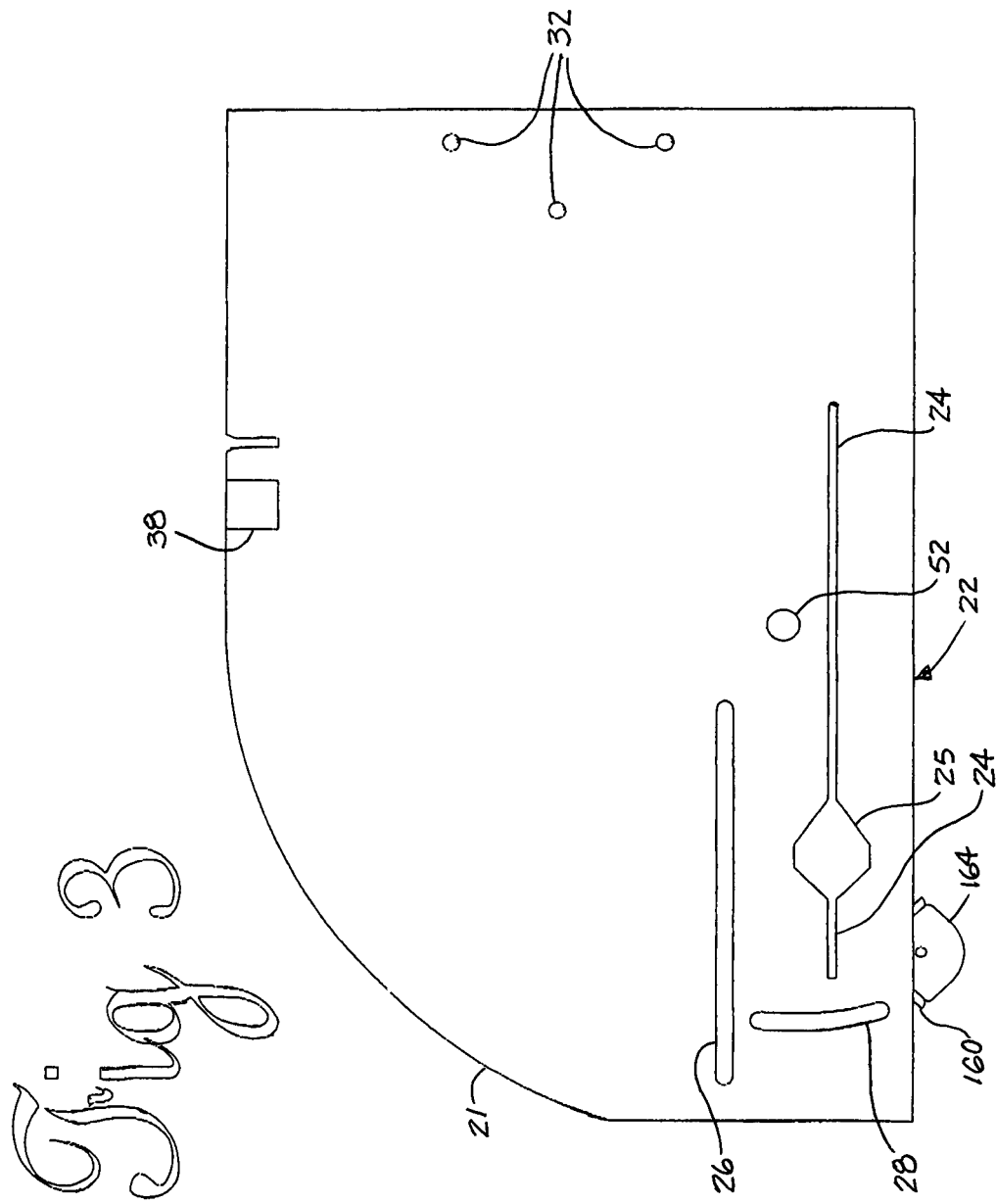

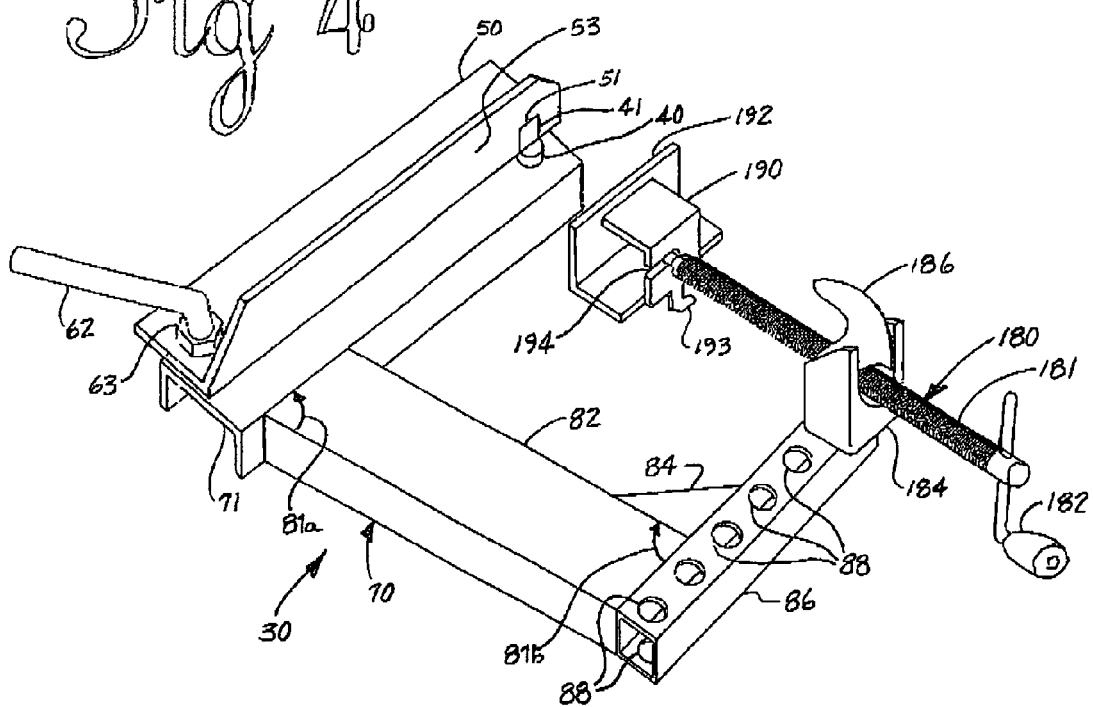

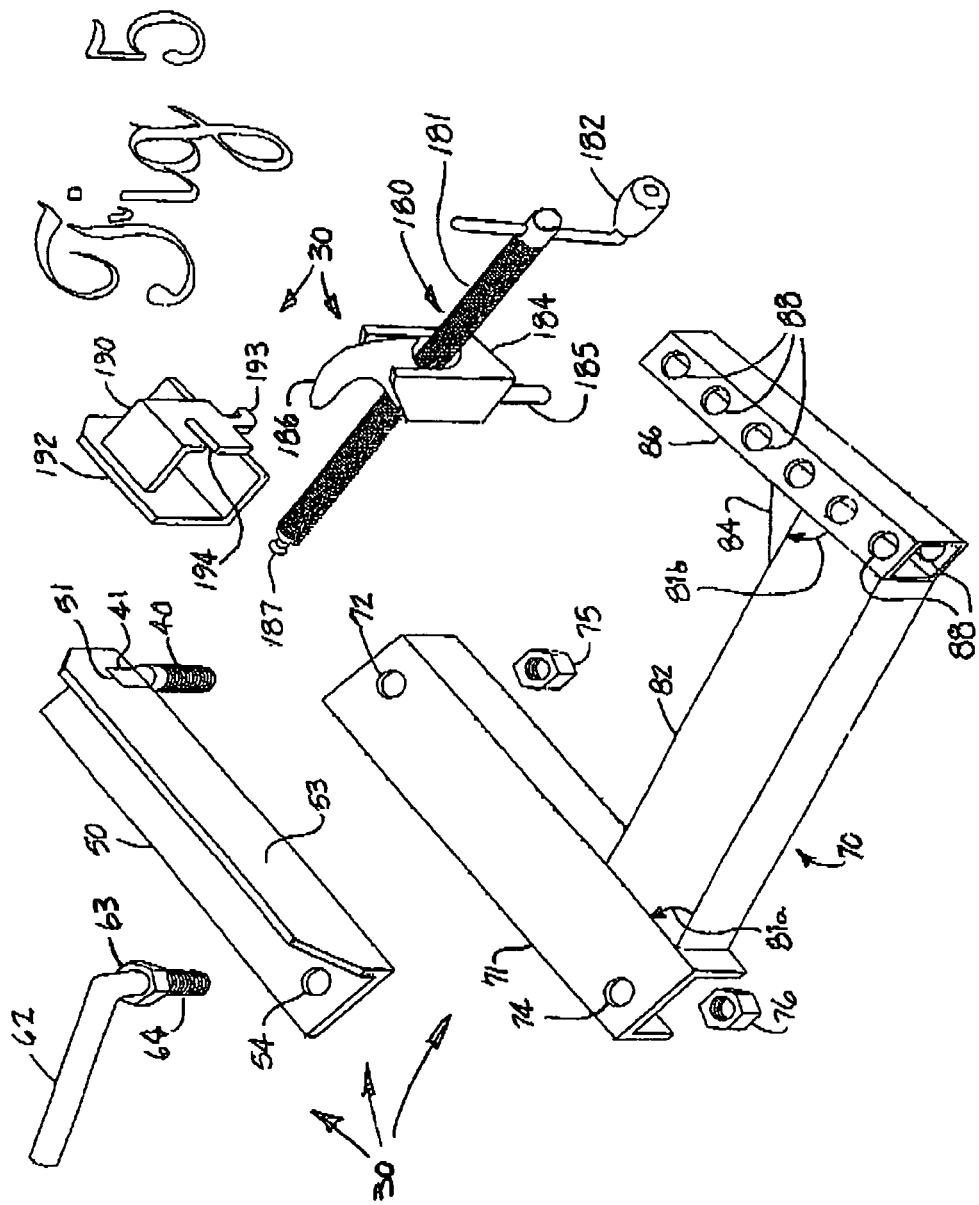

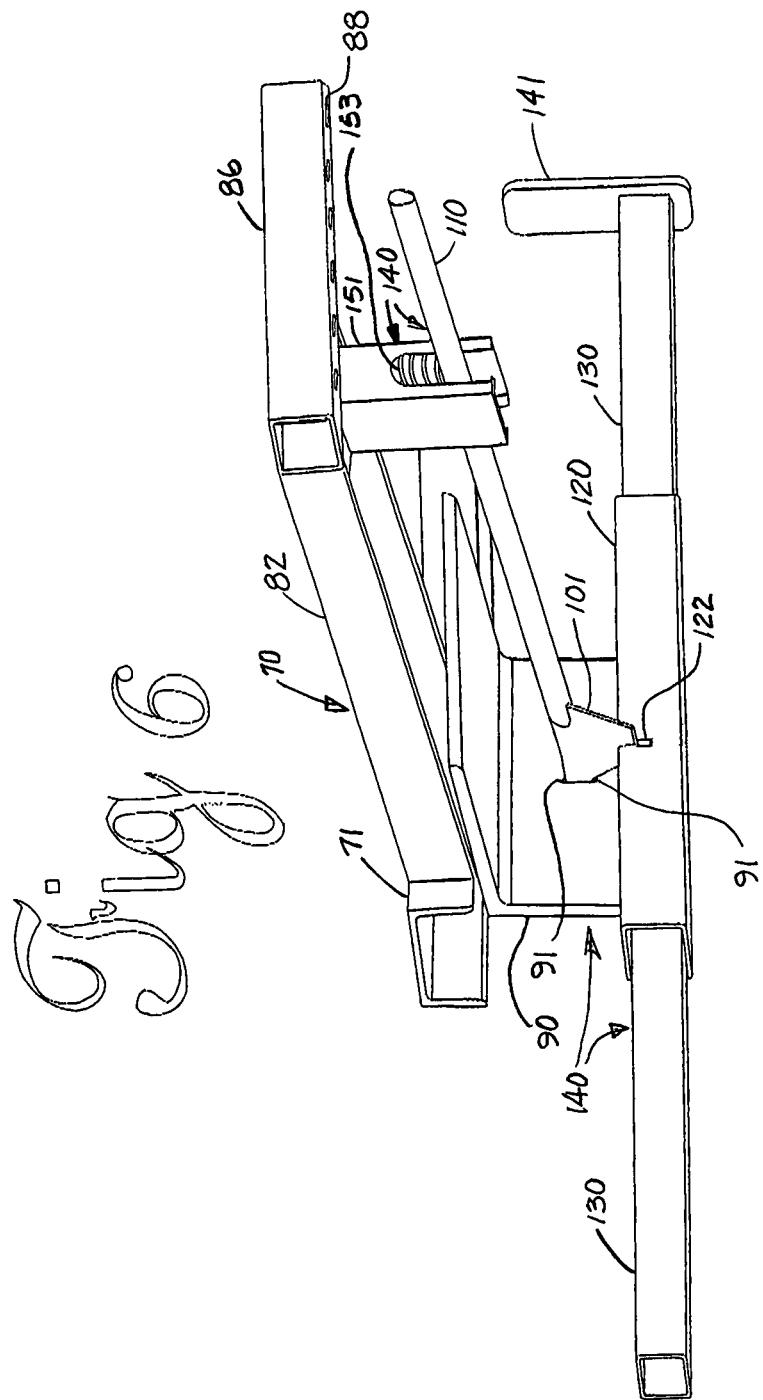

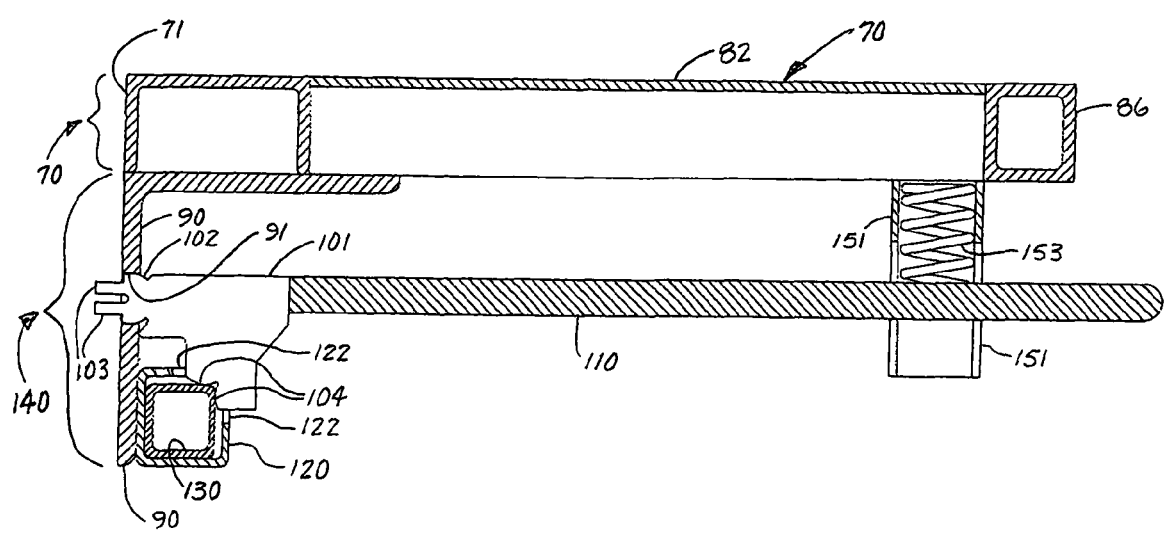

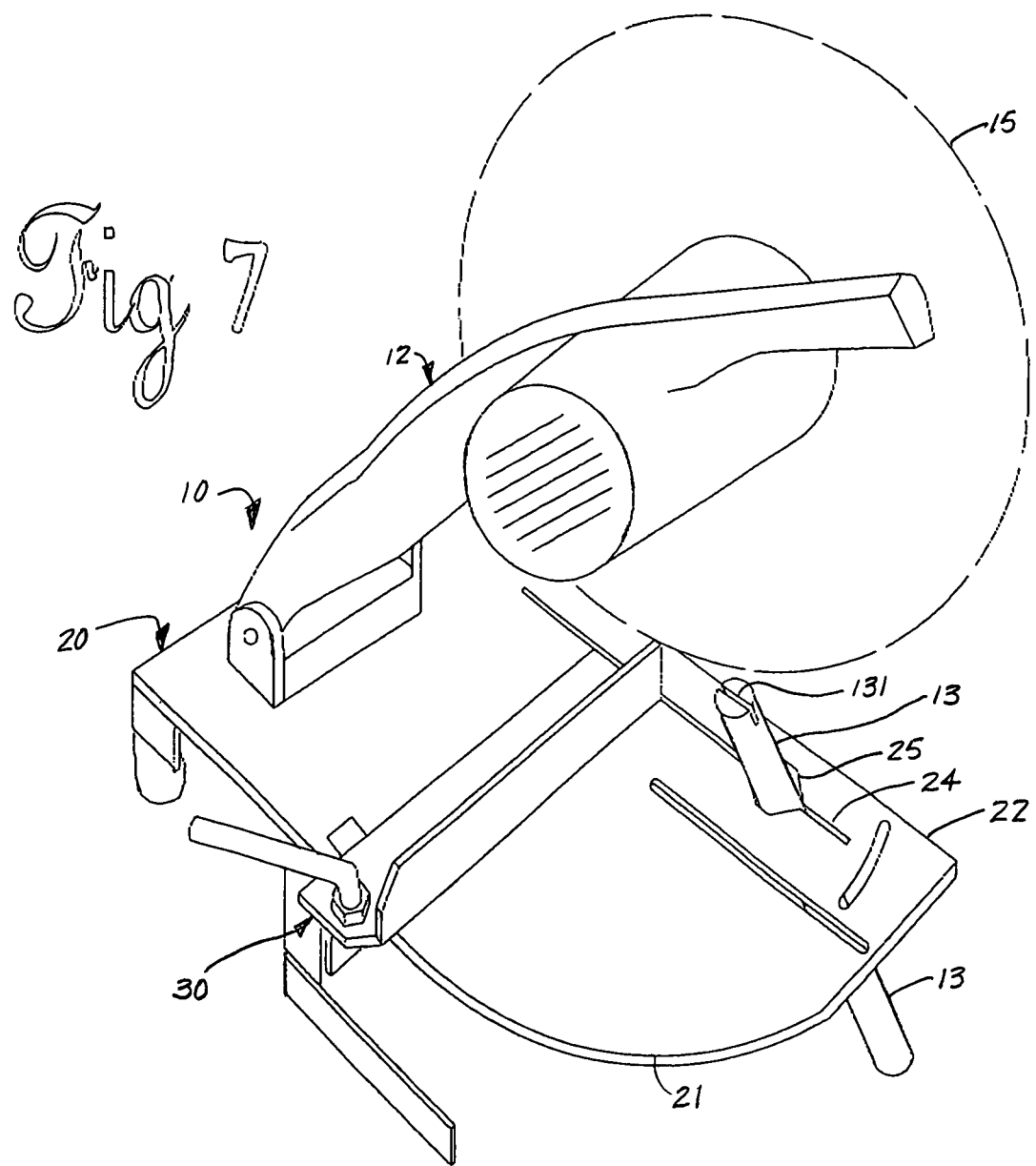

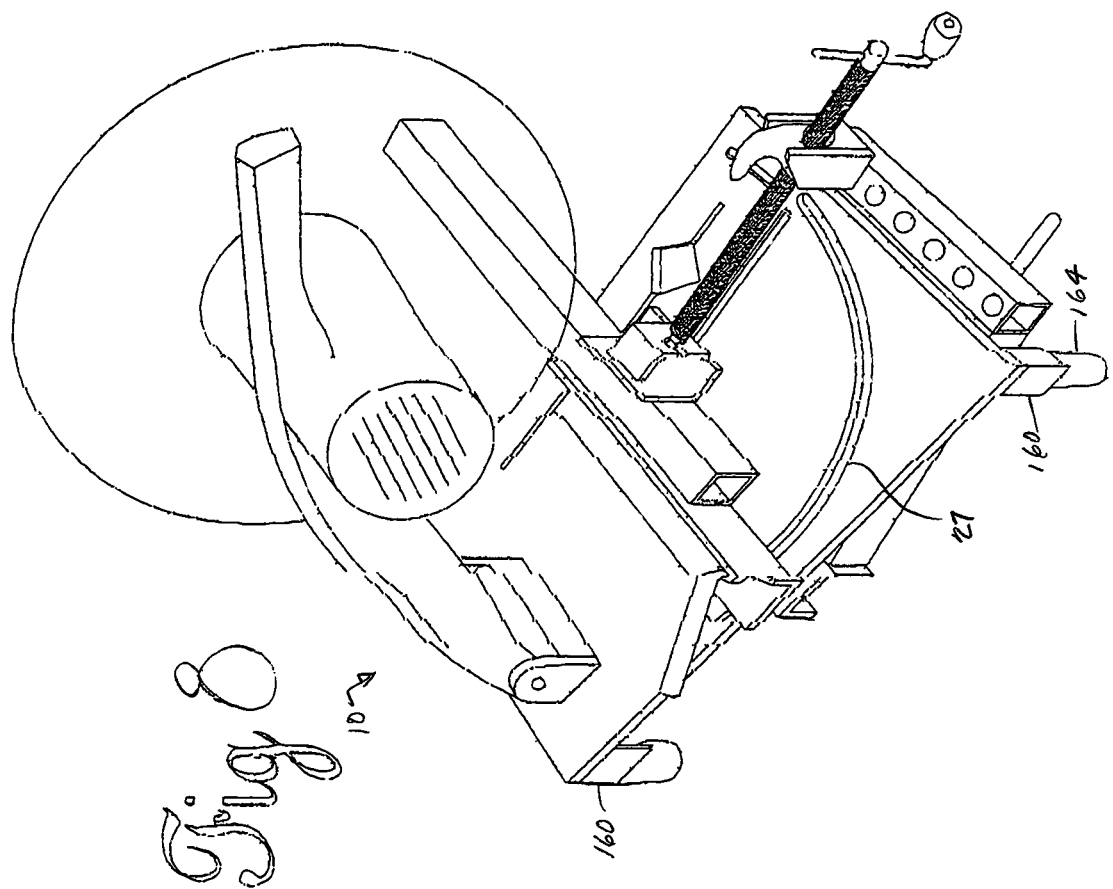

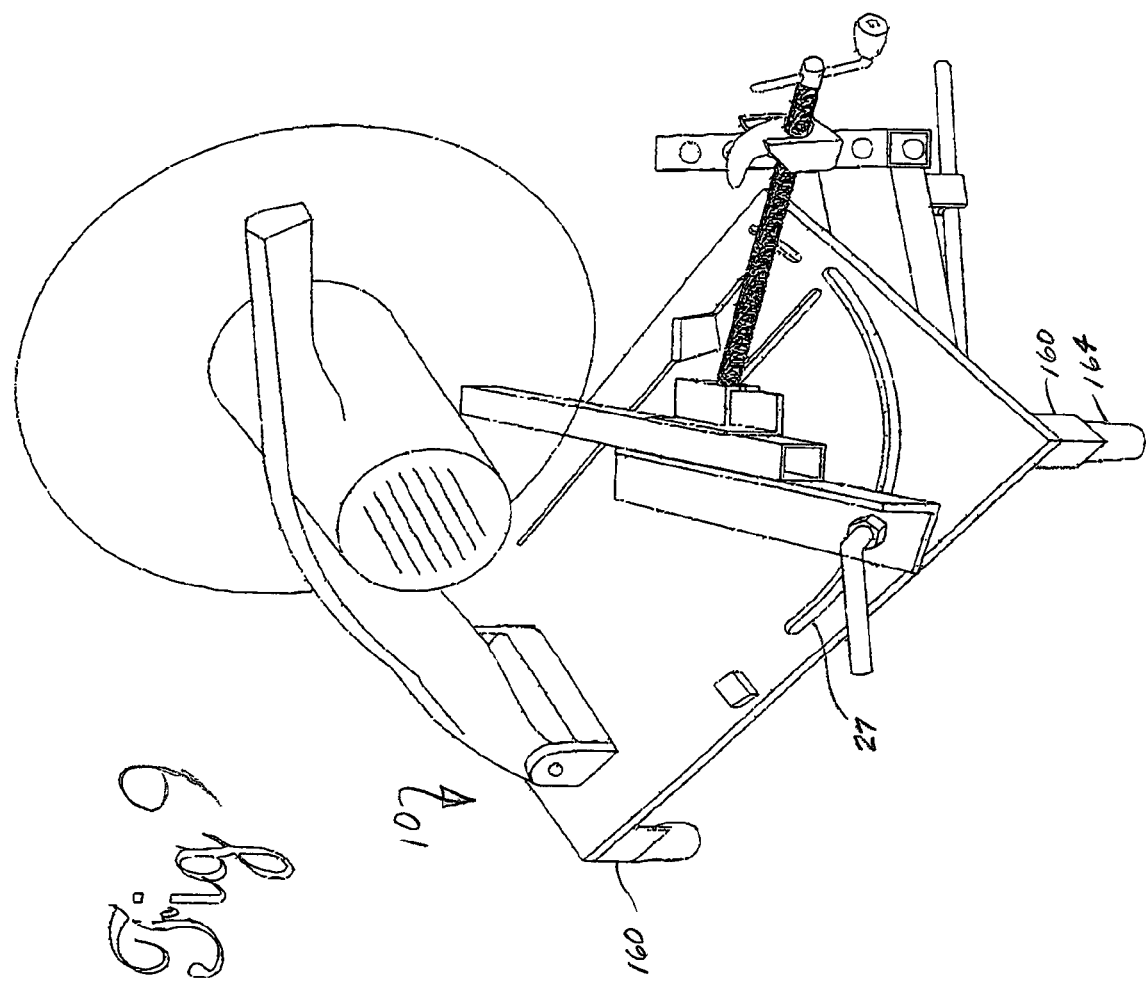

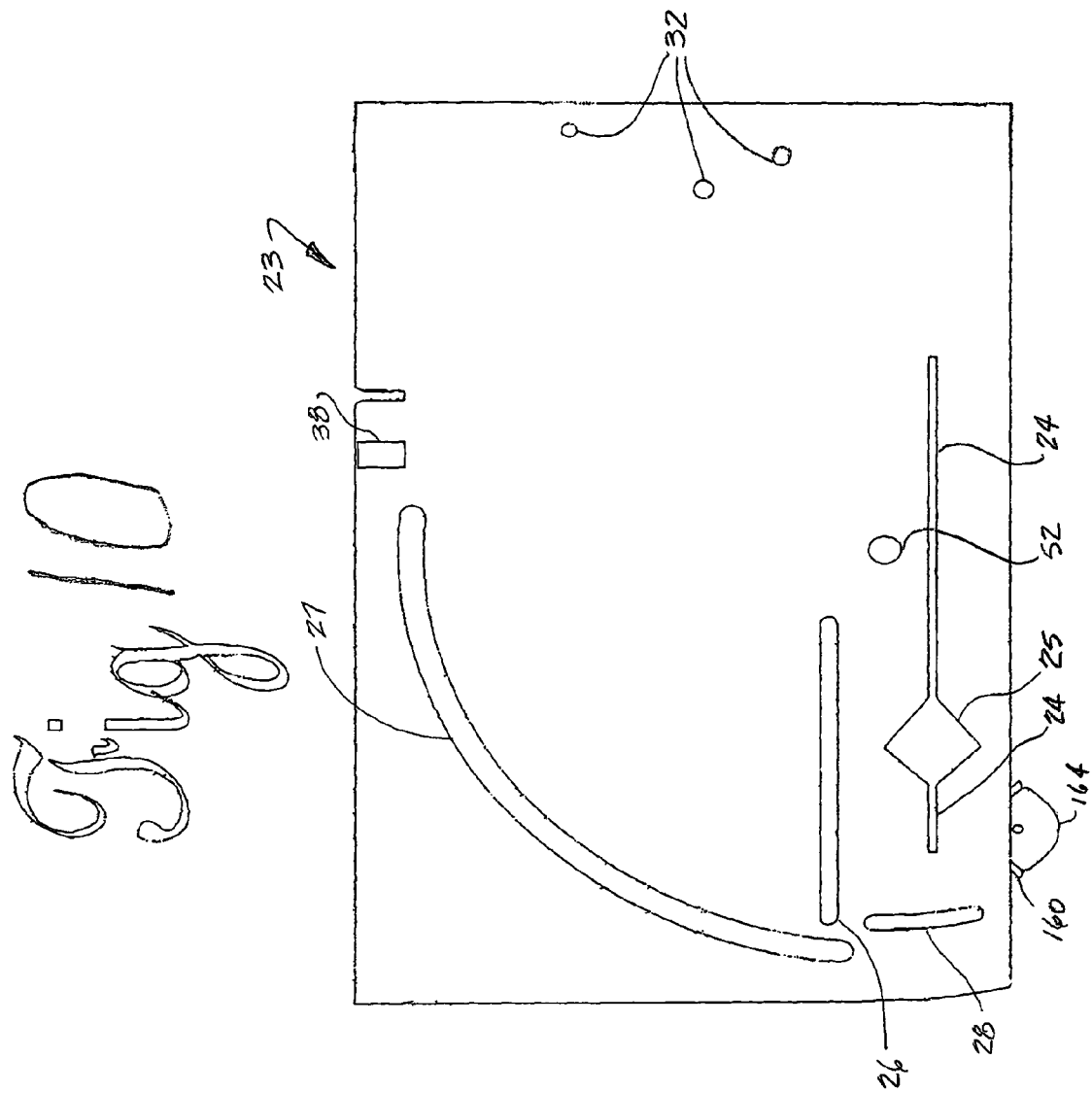

POWER SAW

CROSS REFERENCE TO RELATED APPLICATIONS

This application claims the benefit of U.S. Provisional Patent Application No. 60/809,053, filed on May 25, 2006.

FIELD OF THE INVENTION

The present invention relates to the field of power saws and more particularly to chop saws or cut-off saws.

BACKGROUND OF THE INVENTION

Chop saws (also referred to as cut-off saws) are commonly used power saws that offer convenience, speed and reasonably good safety. They provide the ability to cut pre-selected angles repeatably with good precision. Commercially available chop saws, in spite of their widespread use, however, still have numerous shortcomings.

Among these, the fences are typically too short, making it difficult to align a long piece of material on a relatively small table surface with an excessively small fence.

Likewise, the cutting blade is typically too far from the end of the fence, making it difficult to cut short materials or thin materials without support behind or under them.

It can be overly difficult to cut multiple parts the same length, often requiring each individual part to be separately measured and marked, indexed, clamped and cut.

A common problem is changing angles of the fence. This often entails loosening two bolts, lowering the blade, measuring and setting the desired angle, re-tightening the two bolts and finally clamping the material against the fence prior to cutting. It is not uncommon that during this set-up procedure the fence is inadvertently moved, upsetting the desired angle and requiring the set-up procedure to be repeated (often after having cut the material initially to an angle other than the desired angle). Further, if the clamp bolts were not tightened sufficiently, the combination of vibration, blade friction and the angle may result in allowing the material to creep into the blade and change the fence angle. Finally, returning to a 90 degree cut often requires the same complex set-up procedure.

Brazell, US Patent Application Publication No. 2002/0127960, teaches a pivoting arm cut-off saw that utilizes an angularly pivotal fence with a corresponding quick-release clamp that is representative of the more advanced features of the art. Dibbern Jr. et al., US Patent Application Publication No. 2003/0209107, teach a chop saw with a vise that includes a vise screw with a latch support supporting the vise screw, and a vise jaw disposed at the end of the vise jaw. Preferably, the maximum distance between the vise jaw and the latch support is about equal to or shorter than the distance between the blade center and the latch support when the blade assembly is in the lowered position.

SUMMARY OF THE INVENTION

The power saw described herein (which also may be a chop saw or cut-off saw) offers numerous improvements over prior saws.

It incorporates a fence that is preferably of relatively long length (e.g., about 9.5 inches) to clamp material against. The fence ends adjacent to the edge of the lowered cutting blade for support of small or thin materials and provides an immediate visual index of where the cut will occur. This fence swivels on a vertical or substantially vertical centerline that preferably extends through the plane of the vertical face of the fence, with the pivot point being very close to the lowered cutting blade. The fence swivels up to about 90 degrees about its pivot on the base plate of the saw and can be quickly, conveniently and effectively locked into a desired position with a clamping handle located at the opposite end of the fence. Tightening this clamping handle results in the fence simultaneously gripping the upper and lower surfaces of the base plate. Configured in this fashion, the fence does not move when material is subsequently clamped against it.

An opposing clamp is mounted to the fence (in contrast with being mounted to the base plate in conventional fashion) by means of an extension arm under the base plate. This allows the clamp to rotate around the fence pivot with the fence.

A length-adjustable material stop is provided for accomplishing multiple cuts of the same length, which may be shifted out of the way of the material to be cut after that material has been clamped into desired position as provided for by a movable stop located at the end of the length-adjustable material stop. The length-adjustable material stop rotates with the fence to allow for angle cutting of multiple same-length parts. This length-adjustable material stop can also function from the opposite end of the fence as a back stop. The length-adjustable material stop may be quickly and conveniently adjusted to a new length simply by lifting a spring-loaded lever, adjusting the material stop to the desired length and releasing the lever to allow the spring to secure the material stop at the desired length.

The base plate is preferably located at a height of 5 and ⅜ inches above the surface on which it is placed so that a 2×6 inch board can be used to support the opposite end of long pieces of material.

BRIEF DESCRIPTION OF THE DRAWINGS

FIG. 1 is a perspective view of the power saw configured for making a 90 degree cut.

FIG. 2 is a perspective view of the power saw configured for making an angled cut (e.g., about 45 degrees).

FIG. 3 is a top view of the base plate for use with the power saw.

FIG. 4 is a perspective view of the swivelable fence/clamp assembly.

FIG. 5 is an exploded perspective view of the components of the swivelable fence assembly.

FIG. 6 is a perspective view of a length-adjustable material stop assembly.

FIG. 6A is a side cross-sectional view of the length-adjustable material stop assembly including a material stop clamp.

FIG. 7 is a perspective view of the power saw of the present invention configured for cutting a slot into the center of one end of a piece of round cross-section material.

FIGS. 8-10 are alternatives to FIGS. 1-3 respectively wherein the saw is provided with an alternative base plate having a substantially rectangular shape.

DETAILED DESCRIPTION OF THE DRAWINGS

Figure 6B:
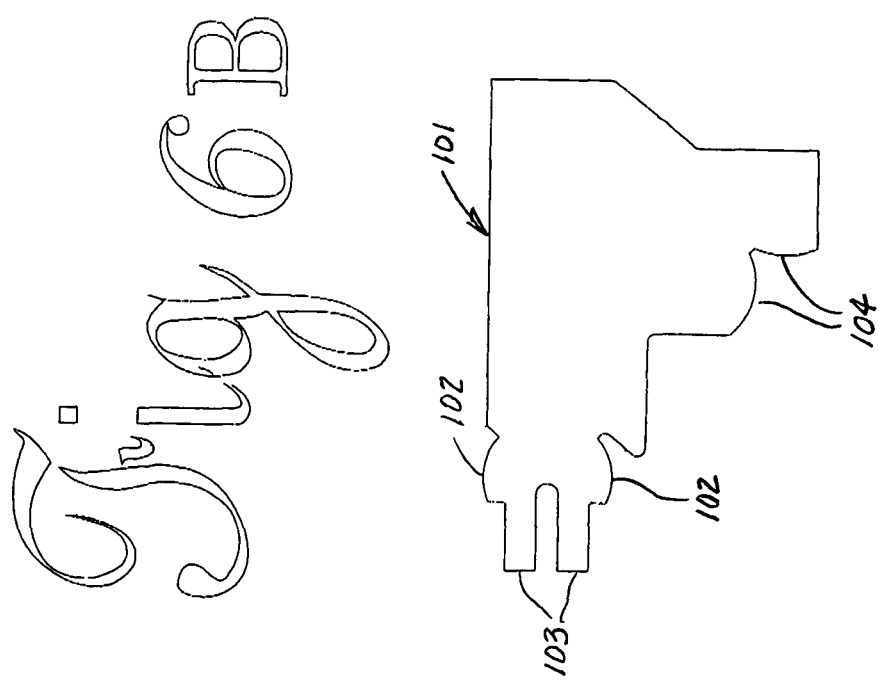
FIG. 6B is a side view of the material stop clamp.

FIG. 1 is a perspective view of the power saw 10, shown configured for making a 90 degree cut. The fundamental component assemblies making up the power saw 10 are the saw assembly 12, the base plate assembly 20, the fence/clamp assembly 30 and, optionally, a material stop assembly 140.

The term "material" is used herein to describe the workpiece intended to be cut by the power saw 10. Material 11 may be metal, steel, plastic or anything else typically cut using power saws. It may be of a wide range of shapes and dimensions.

Saw assembly 12 generally comprises a motor 14, an easily removable and replaceable blade 15, and a swing arm 16 manually operated via a handle 17. Swing arm 16 is attached to the base plate 22 of the power saw 10 via mount 170 and pivot 18, about which the saw assembly 12 is raised and lowered by the person operating the power saw 10. Generally, saw assembly 12 is conventional. For example, motor 14 may preferably be an alternating current electric motor. Blade 15 is typically a circular saw blade, chosen according to the type of material 11 intended to be cut.

In alternative embodiments, the saw assembly 12 may utilize a reciprocating blade or an endless band saw blade. The fence/clamp assembly 30 described herein is also useful for these alternatives.

FIG. 2 is a perspective view of the power saw 10 configured for making an angled cut (e.g., about 45 degrees). This figure shows how the fence/clamp assembly 30 pivots to allow angled material cuts.

FIG. 3 is a top view of the base plate 22 for use with the power saw 10. Base plate 22 includes blade slot 24 which in turn preferably includes diamond-shaped aperture 25 intended to allow slotting of one end of round cross section material, as will be subsequently described. Base plate 22 is further provided with clamp slot 26 and alternative clamp slot 28. The base plate 22 is also provided with round pivot hole 52 about which the fence/clamp assembly 30 pivots or swivels. A corner of the base plate 22 is provided with a radiused edge 21 to correspond to the arc through which the fence/clamp assembly 30 swivels and to provide clearance for the threaded shaft of fence position lock handle 62 (shown in FIGS. 1 and 2). This handle 62 may be loosened to allow the fence/clamp assembly 30 to be moved to a desired angle. When the desired angle is achieved, this handle 62 may be tightened, clamping the fence/clamp assembly 30 against the upper and lower surfaces of base plate 22 to secure the desired angle. A conventional detent mechanism (not shown) may be provided for the swivelable fence/clamp assembly 30 for location of common cutting angles such as 45 degrees, 22.5 degrees, etc.

In another alternative (not shown), base plate 22 may be provided as a rectangular shape with four 90 square corners, wherein radiused edge 21 is provided as a curved slot extending through base plate 22 to accommodate the shaft (threaded end 64) of handle 62 for the full swivel range of fence/clamp assembly 30. This embodiment allows the provision of a leg located at the square corner extending beyond the curved slot.

Fence stop 38 is attached to the upper surface of base plate 22 in a suitable manner (such as by welding) and protrudes above that surface to serve as a stop for locating the fence 50 for making 90 degree cuts across material 11. Base plate 22 is provided with mounting holes 32 to attach saw assembly 12 and mount 170 to base plate 22; these mounting holes 32 are arranged to suit the saw assembly 12.

Finally, as partially shown in FIGS. 1, 2 and 3, base plate assembly 20 (which includes base plate 22) is provided with four legs 160 attached to the lower surface of base plate 22 and located appropriately to provide maximum stability. Preferably, legs 160 are provided with rubber feet 164. Leg 160 adjacent the radiused edge 21 of base plate 22 may be provided with a horizontal extension 162 at the lower end of that leg. Horizontal extension 162 serves to stabilize saw 10 and compensate for not being able to provide a leg located within the swivel arc of fence/clamp assembly 30.

FIG. 4 is a perspective view of the swivelable fence/clamp assembly 30, while FIG. 5 shows an exploded perspective view of the components of swivelable fence assembly 30. Swivelable fence/clamp assembly 30 comprises fence 50 with lock handle 62, fence follower assembly 70 and clamp assembly 180. The entire swivelable fence/clamp assembly 30 pivots from fence pivot bolt 40 and is thus capable of being swiveled across the upper and lower surfaces of base plate 22.

Fence 50 includes fence vertical face 53. Fence pivot bolt 40 is affixed (preferably by welding) to fence 50 so that the longitudinal axis of pivot bolt 40 lies in the plane of fence vertical face 53. The one half of the upper end 41 of pivot bolt 40 is cutaway so that it does not protrude beyond fence vertical face 53; the remaining portion of the upper end 41 of pivot bolt 40 is inserted into a corresponding slot 51 cut into fence 50 and may be welded into this slot 51.

The end of fence 50 opposite to the end attached to pivot bolt 40 is provided with hole 54 to accommodate the threaded end 64 of lock handle 62. Nut 63 is affixed to the upper end of threads 64 to support handle 62 when threaded end 64 is inserted through hole 54. Hole 54 is of diameter sufficient to provide minimal clearance for threaded end 64 while allowing threaded end 64 to swivel freely.

Fence 50 attaches to fence follower assembly 70 generally as shown in FIG. 4. As shown in FIG. 5, fence follower assembly 70 comprises fence follower 71, fence follower extension 82 and clamp mounting rail 86. These components are joined together, preferably by welding, to create fence follower assembly 70. The upper surfaces of each of these three components preferably lie in the same plane. Fence follower 71 and fence follower extension 82 are preferably made from channel with the open side of the channel oriented to face downward. Clamp mounting rail 86 is preferably made from square tubing and provided with a series of corresponding pairs of holes 88 in the upper and lower surfaces of the square tubing, with the holes of each pair sharing a common centerline. These holes 88 provide alternative locations for inserting the base pin 185 of clamp assembly 180.

One end of fence follower extension 82 is preferably affixed to one side of fence follower 71 at an angle 81a of less than 90 degrees, preferably about 75 degrees. The same or similar angle 81b is used for attachment of the opposite end of fence follower extension 82 to clamp mounting rail 86. The side of fence follower 71 (i.e. fence vertical face 53) is intended to be substantially parallel to the length of clamp mounting rail 86 to provide for proper function of clamp assembly 180.

In use, pivot bolt 40 (affixed to fence 50) extends through hole 52 in base plate 22, and then through hole 72 in fence follower 71. It is retained by locknut 75, which is tightened on pivot bolt 40 to a point that leaves pivot bolt 40 free to swivel through hole 52. Both of holes 52 and 72 should be of minimal diameter appropriate to provide clearance for pivot bolt 40. Threaded end 64 of locking handle 62 is inserted through hole 54 in fence 50 and through corresponding hole 74 in fence follower 71. Threaded end 64 is threaded into nut 76 which is fastened to (preferably by welding) the underside of fence follower 71 in line with hole 74. Alternatively to the use of nut 76, hole 74 may be provided with female threads to mate with threaded end 64 of lock handle 62.

Clamp assembly 180 comprises threaded shaft 181 and turning handle 182. The end of shaft 181 opposite handle 182 is provided with reduced diameter tip 187. Shaft 181 resides in saddle 184 which is in turn provided with a quick-release half-nut 186 that engages the threads of shaft 181 when pivoted to the downward position. Quick-release half-nut 186 is conventional, being of the type commonly used in conjunction with the movable jaw of vises. It is hinged at one end and provided with a lifting lever to allow it to be lifted away from shaft 181 to quickly disengage the threads of shaft 181. Saddle 184 is provided with base pin 185 of appropriate diameter and length to extend through a pair of upper and lower holes 88 in clamp mounting rail 86 with minimal clearance.

Reduced diameter tip 187 of threaded shaft 181 engages slot 194 of material clamp 190. Material clamp 190 is preferably fabricated from a short length of angle stock and affixed to (preferably by welding) material clamp face 192 as shown. Material clamp face 192 is also made from a length of angle, preferably slightly longer than used for material clamp 190. Material clamp 190 includes tab 193 intended to engage clamp slot 26 in base plate 22 (or alternatively may be inserted into alternate clamp slot 28 when clamping wider materials at fence angles of about 45 degrees).

FIGS. 6 and 6A are respectively a perspective view and a side cross-sectional view of the optional length-adjustable material stop assembly 140. FIG. 6B is a side view of the material stop adjustment clamp 101. This material stop assembly 140 when adjusted to a desired length (bringing material stop 141 up against one end of the material 11 to be cut) may be used to allow consistent cutting of material 11 to pieces of equal length.

Length-adjustable material stop assembly 140 is affixed to the underside of fence follower assembly 70 by material stop assembly support 90, which may be made from a length of large angle stock. Being attached to the follower assembly 70, the length-adjustable material stop assembly 140 swivels with the follower assembly 70. Material stop assembly support 90 is preferably welded to the underside of the fence follower assembly 70. Guide tube 120, preferably made of a length of square cross-section tubing, is affixed to (preferably by welding) the lower portion of material stop assembly support 90. Material stop extension 130 is also preferably a length of square cross-section tubing, of cross-sectional dimensions to fit easily and slideably within guide tube 120. One end of material stop extension 130 is provided with material stop 141. This material stop 141 may be made to any length desired to effectively stop against one end of a length of material 11. Material stop 141 may also be swivelable with respect to its attachment to material stop extension 130 if desired.

Material stop assembly 140 includes material stop clamp 101 affixed to material stop release handle 110 as shown. The opposite end of material stop release handle 110 is located in slotted spring guide 151 that contains spring 153. Material stop clamp 101 has opposing bearing surfaces 102 that engage slot 91 in the material stop assembly support 90. A pair of locating tangs 103 extends through slot 91 and may optionally be spread apart from each other after insertion into slot 91 to retain the material stop clamp 101 in slot 91. Material stop clamp 101 includes a pair of radiused pressure points 104 located 90 degrees apart from each other. These radiused pressure points 104 extend through slot 122 that is provided through the wall of guide tube 120. The width of slot 122 is such that the thickness of the material stop clamp 101 (with radiused pressure points 104) is accommodated with minimal clearance. The pair of pressure points 104 engages the surfaces of material stop extension 130 to hold it securely at any desired length. The pressure points 104 are released from engagement with material stop extension 130 by raising the end of material stop release handle 110 against spring 153, thereby allowing material stop extension 130 to be moved slideably through guide tube 120 to a different desired length.

FIG. 7 is a perspective view of the power saw 10 configured for cutting a slot 131 into the center of one end of a piece of round cross-section material 13. This is accomplished by inserting the round material into the diamond-shaped aperture 25 provided in base plate 22. Shapes other than round cross sections may also be cut in this fashion, for example, square, rectangular, hexagonal and angle shapes.

Preferred materials for making the various components of power saw 10 include aluminum and steel. Various components not requiring the strength of steel are preferably made from aluminum to reduce weight.

Power saw 10 may also optionally be provided with means for attaching the saw to another larger surface. These means may include mounting holes or slots to accommodate chain links, either of which may be located as desired on the saw so long as they do not interfere with the functional aspects of the saw.

FIGS. 8-10 are alternatives to FIGS. 1-3 respectively wherein saw 10 is provided with an alternative base plate 23 having a substantially rectangular shape that allows for provision of a supporting leg 160 located below each corner of the rectangularly shaped plate 23. The use of the rectangular shape results in radiused edge 21 of base plate 22 being replaced by radiused slot 27 in rectangularly shaped base plate 23. FIG. 10 also describes a slightly different alternative shape for aperture 25.

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. A power saw assembly comprising a base plate having upper and lower surfaces and having a powered blade assembly for driving a saw blade and having at least one position for cutting material wherein said saw blade extends at least partially through a slot in said base plate and wherein said base plate and blade assembly are not swivelable together about an axis component with respect to a surface upon which the power saw assembly has been placed, said power saw assembly further including a fence assembly that includes a clamp assembly for clamping the material against a substantially vertical face of the fence assembly wherein said clamp assembly is configured to apply substantially all clamping force in a direction substantially perpendicular to the face of the fence assembly and wherein said clamp assembly is connected to said fence assembly by an extension arm disposed under the base plate such that said fence assembly and clamp assembly are swivelable together about a single pivot component and its longitudinal axis that extends through the pivot component, said longitudinal axis located in a fixed position with respect to the base plate and oriented substantially vertical to the upper surface of the base plate, said fence assembly and clamp assembly being swivelable about the single pivot component from a first position allowing the saw blade to cut through the material at an angle of 90 degrees with respect to a length of the material, to other positions allowing the saw blade to cut through the material at angles other than 90 degrees with respect to the length of the material, said fence assembly being securable to the base plate at any position.

2. A power saw assembly according to claim 1 wherein the fence assembly is securable to the base plate by clamping the fence assembly against the upper and lower surfaces of the base plate with a quickly-releasable clamp.

3. A power saw assembly according to claim 1 having a length-adjustable material stop assembly swivelable about the single pivot component with the fence assembly.

4. A power saw assembly according to claim 3 wherein said length-adjustable material stop assembly may be quickly released from a length position into which it has been previously locked by movement of a lever; and locked into a length position by releasing the lever.

5. A power saw assembly according to claim 1 wherein said longitudinal axis is coincident with said substantially vertical face of the fence assembly.

6. A power saw assembly comprising a horizontally oriented base plate having upper and lower surfaces and having a powered blade assembly for driving a saw blade intended for cutting material, said powered blade assembly being mounted to the upper surface of the base plate and wherein said base plate and blade assembly are not swivelable together about an axis component with respect to a surface upon which the power saw assembly has been placed, said powered blade assembly being raiseable to a position with said saw blade entirely above the base plate and lowerable to a position with said saw blade extending at least partially through a slot in said base plate, said power saw assembly further including a fence assembly that includes a clamp assembly for clamping the material against a substantially vertical face of the fence assembly wherein said clamp assembly is configured to apply substantially all clamping force in a direction substantially perpendicular to the face of the fence assembly and wherein said clamp assembly is connected to said fence assembly by an extension arm disposed under the base plate such that said fence assembly and clamp assembly are swivelable together about a single pivot component and its longitudinal axis that extends through the pivot component, said longitudinal axis located in a fixed position with respect to the base plate and oriented substantially vertical to the upper surface of the base plate, said fence assembly and clamp assembly being swivelable about the single pivot component from a first position allowing the saw blade to cut through the material at an angle of 90 degrees with respect to a dimension of the material, to other positions allowing the saw blade to cut through the material at angles other than 90 degrees with respect to the dimension of the material, said fence assembly being securable to the base plate at any position.

7. A power saw assembly according to claim 6 wherein the fence assembly is securable to the base plate by clamping the fence assembly against the upper and lower surfaces of the base plate with a quickly-releasable clamp.

8. A power saw assembly according to claim 6 having a length-adjustable material stop assembly swivelable about the single pivot component with the fence assembly.

9. A power saw assembly according to claim 8 wherein said length-adjustable material stop assembly may be quickly released from a length position into which it has been previously locked by movement of a lever, and locked into a length position by releasing the lever.

10. A power saw assembly according to claim 6 wherein said longitudinal axis is coincident with said substantially vertical face of the fence assembly.

\* \* \* \* \*